United States Patent [19]

Graf et al.

[11] Patent Number: 5,465,758
[45] Date of Patent: Nov. 14, 1995

[54] APPARATUS FOR SEALING LEAKAGE POINTS IN PIPES FROM THE INSIDE OF THE PIPE, AND A METHOD OF SEALING THE LEAKAGE POINTS

[75] Inventors: Eckhard Graf; Jürgen Graf, both of Oberbaldingen; Hubert Mauz, Donaueschingen, all of Germany

[73] Assignee: Uhrig Kanaltechnik GmbH, Geisingen, Germany

[21] Appl. No.: 343,901

[22] Filed: Nov. 17, 1994

[30] Foreign Application Priority Data

Dec. 3, 1993 [DE] Germany ............................ 9318409 U
Jan. 19, 1994 [DE] Germany ............................ 44 01 318.3

[51] Int. Cl.⁶ .................................................. F16L 55/162
[52] U.S. Cl. ........................ 138/98; 138/97; 405/150.1
[58] Field of Search ........................ 138/97, 98, 93; 405/150, 154, 156, 157

[56] References Cited

U.S. PATENT DOCUMENTS 3,149,646  9/1964  Xenis ............................ 138/97
3,474,832  10/1969  Broadhead et al. .................... 138/97
3,700,265  10/1972  Dufour et al. ........................ 138/97
3,915,197  10/1975  Piccirilli ............................ 138/93
4,253,497   3/1981  Martin et al. ........................ 138/97
4,724,108   2/1988  Jurgenlohmann et al. .............. 138/98
4,995,761   2/1991  Barton .............................. 138/98
5,076,618  12/1991  Bridges ............................. 138/97
5,086,809   2/1992  Bridges ............................. 138/98
5,190,705   3/1993  Corazza ............................ 138/97
5,285,817   2/1994  Sigel ............................... 138/97
5,351,720  10/1994  Maimets ............................ 138/98
5,423,630   6/1995  Imoto et al. ........................ 138/97

Primary Examiner—David Scherbel
Assistant Examiner—James F. Hook
Attorney, Agent, or Firm—Spencer, Frank & Schneider

[57] ABSTRACT

A resilient sealing sleeve supported by a mounting cart is directed to a leakage point in pipes in order to seal them. The sealing sleeve is raised to the top of the pipe by a raising and lowering device, and widened there in the circumferential direction by a widening device provided on the mounting cart. A stopping device on the sealing sleeve holds the sleeve in its widened position for the purpose of sealing the pipe.

14 Claims, 2 Drawing Sheets

APPARATUS FOR SEALING LEAKAGE POINTS IN PIPES FROM THE INSIDE OF THE PIPE, AND A METHOD OF SEALING THE LEAKAGE POINTS

CROSS-REFERENCE TO RELATED APPLICATION

This application claims the priority of Patent Applications G 93 18 409.3 filed Dec. 3, 1993 and P 44 01 318.3 filed Jan. 19, 1994, in Germany, the subject matter of which is incorporated herein by reference.

BACKGROUND OF THE INVENTION

The invention relates to an apparatus for sealing leakage points in pipes from the inside of the pipe, having a sealing sleeve that can be widened (expanded) in the circumferential direction at the leakage point, and a mounting cart (repair cart) that can be directed to the leakage point. The sealing sleeve is in the form of a widenable band made of a resilient material and bent into a ring shape. The two band ends overlap in the circumferential direction. The band is completely enclosed by a hose of rubber-elastic material, and supports an immobilizing device, which holds it in the widened state, and the mounting cart has an undercarriage provided with wheels. The invention further relates to a method of sealing leakage points in pipes by employing the sealing sleeve and the mounting cart.

The invention is used particularly in connection with the reconstruction of pipe systems, and serves primarily in the repair of leakage points of underground canal pipes made of concrete or a similar material.

It is known to seal leakage points of pipes from the inside of the pipe. Sealing sleeves that are made of resilient material, coated with rubber, bent into a spiral shape and inserted into the pipe from a cart are used for this purpose. The sleeves are widened at the point of the leakage by means of an air cushion that is inflatable from the outside until they have come to rest against the inside wall of the pipe. A stopping (immobilizing) device holds the sleeve in its widened position. It is a disadvantage of such prior art procedure that the large forces required to press the sealing sleeve are difficult to attain with the air cushion, and a complete sealing of the leak is difficult to achieve.

SUMMARY OF THE INVENTION

The object of the invention lies in the conception of a sealing sleeve and a mounting cart suited for bringing it inside the pipe; with the aid of the cart, a very reliable sealing of leaks can be performed inside the pipe in a simple, time- and cost-saving manner.

The point of departure of accomplishing this object is an apparatus of the type described at the outset, and according to the invention the sealing sleeve has at least one widening device which can be operated by the mounting cart, and to which the stopping device is connected. The mounting cart has an operating device for the widening device, and a raising and lowering device for the operating device.

The proposed arrangement of a widening device on the sealing sleeve itself, in connection with the widening of the sleeve by means of the operating device of the mounting cart, which can be raised and lowered, permits fast "setting" of the sealing sleeve after positioning has taken place, with the use of large widening forces, resulting in a secure seal.

In an advantageous embodiment, the widening device of the sealing sleeve comprises at least one slot disposed at the inner-lying band end in the circumferential direction, whose one longitudinal side has a row of teeth. A pinion that engages the row of teeth is rotatably seated at the outer-lying band end. This configuration of the widening device does not only permit simple operation by the mounting cart; it also permits the exertion of large pressing forces.

A locking bolt that extends into the pinion, is under the effect of a spring element and lies in the slot can serve as the stopping device. Such a locking bolt represents an economical, simple-to-mount and reliably-functioning blocking device.

It is expedient to provide the inner-lying band end of the sealing sleeve with a guide groove extending in the circumferential direction. A hold-down device that is secured in the outer-lying band end extends into the guide groove. This measure maintains the resilient sealing sleeve in its provided assembly stage prior to expansion, in which stage the diameter of the sealing sleeve is smaller than the inner clearance of the pipe to be sealed. Moreover, this guide groove serves to guide the two overlapping band ends during the expansion process.

To improve sealing, particularly of pipes having a very rough, fissured inside surface, the sealing sleeve can have on its hose two circumferentially-extending sealing bands made of a rubberlike material that swells upon contact with water; these bands are disposed closely adjacent to the two circumferential edges of the sealing sleeve.

It is particularly advantageous when copper strips are inserted into the sealing bands. This reliably prevents fine branches of plant roots from growing through, because oxidizing copper is poisonous to plants.

As the operating device for the widening device of the sealing sleeve, the undercarriage of the mounting cart supports at least one motor-driven rotary screwdriver (rotary driving) device whose screw mechanism has on its head an insertion stub for the pinion of the widening device. This configuration of the operating device can be realized by an economical, commercially-available rotary screwdriver device.

A reliable travel of the mounting cart is assured when its undercarriage has four wheels, of which two each are rotatably mounted on a common axle.

To form the raising and lowering device, each axle of the wheels is advisably articulated to the undercarriage by means of a pivot frame, and a cylinder-piston unit engages each pivot frame. Commercially-available cylinder-piston units can be used for this purpose.

During the considerable tightening of the widening device, it can occur that the screw mechanisms of the rotary screwdriver device do not separate from the pinions due to stress, and the mounting cart therefore cannot be set down onto the bottom of the pipe. To effect the separation of the mounting cart from the "set" sealing sleeve, the cart can have at least one mechanical pressure plunger which is effective perpendicular to the direction of travel of the mounting cart.

A coupling device is advisably provided on the undercarriage of the mounting cart for coupling to a remote-controlled driving cart.

The following procedure can be used to seal leakage points in pipes from the pipe interior using a mounting cart and a sealing sleeve, as described above, in which the mounting cart, which supports the sealing sleeve, is directed to the leakage point, where the sealing sleeve is widened in the circumferential direction: first, the sealing sleeve is pushed over the mounting cart such that it encompasses the cart's undercarriage, leaving its wheels free. Then the sealing sleeve is laid onto the mounting cart and thereafter then raised to the top of the inside of the pipe and pressed there. Subsequently, the widening device of the sealing sleeve is actuated by the operating device of the mounting cart and set in operation. The sealing sleeve is widened until it lies tightly against and around the inside circumference of the pipe, and the sealing sleeve is then fixed in the widened state by the stopping device to stay by itself.

Expediently—if required—the mounting cart is eventually separated from the "set" sealing sleeve by pushing away by mechanical pressure plungers.

DETAILED DESCRIPTION OF THE PREFERRED EMBODIMENTS

Figure 1:
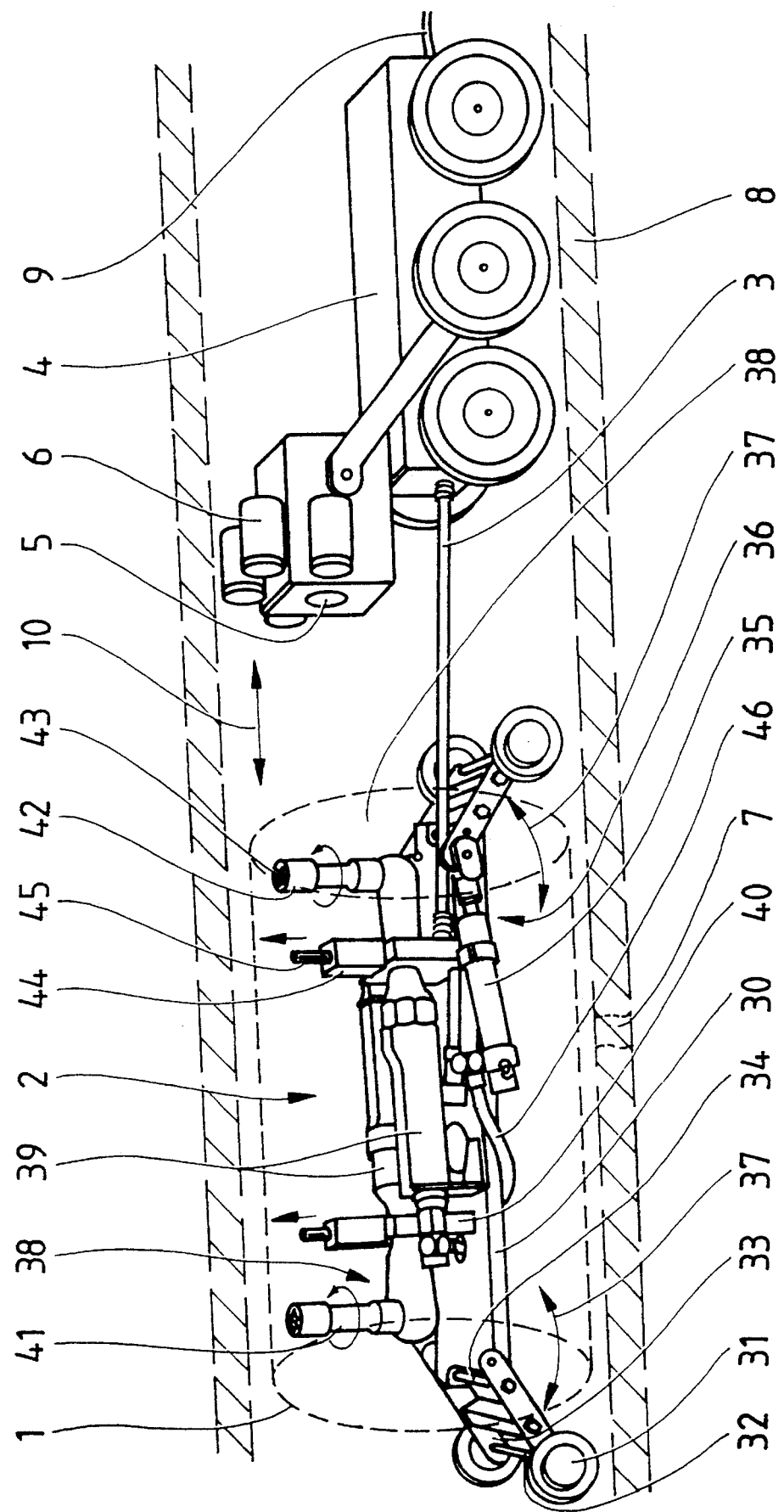
FIG. 1 perspective view of a mounting cart inside a pipe, a sealing sleeve supported by the mounting cart and a remote-controlled, travelling driving cart coupled to the mounting cart.

Turning to FIG. 1, the apparatus according to the invention, serving to seal leakage points in pipes comprises a sealing sleeve 1 and a mounting cart 2 connected to a multi-axle driving cart 4 by means of a coupling device 3. The driving cart 4 supports a television camera 5 and four spotlights 6, and serves to direct mounting cart 2 to a leakage point 7 of a pipe 8 to be sealed, for example, a concrete pipe. For this purpose driving cart 4 is connected via a flexible line 9 to a control and energy supply station (not shown) which is located outside of pipe 8. Driving cart 4 and mounting cart 2 travel in the travel direction 10 and along the bottom of the inside of pipe 8.

Figure 2:
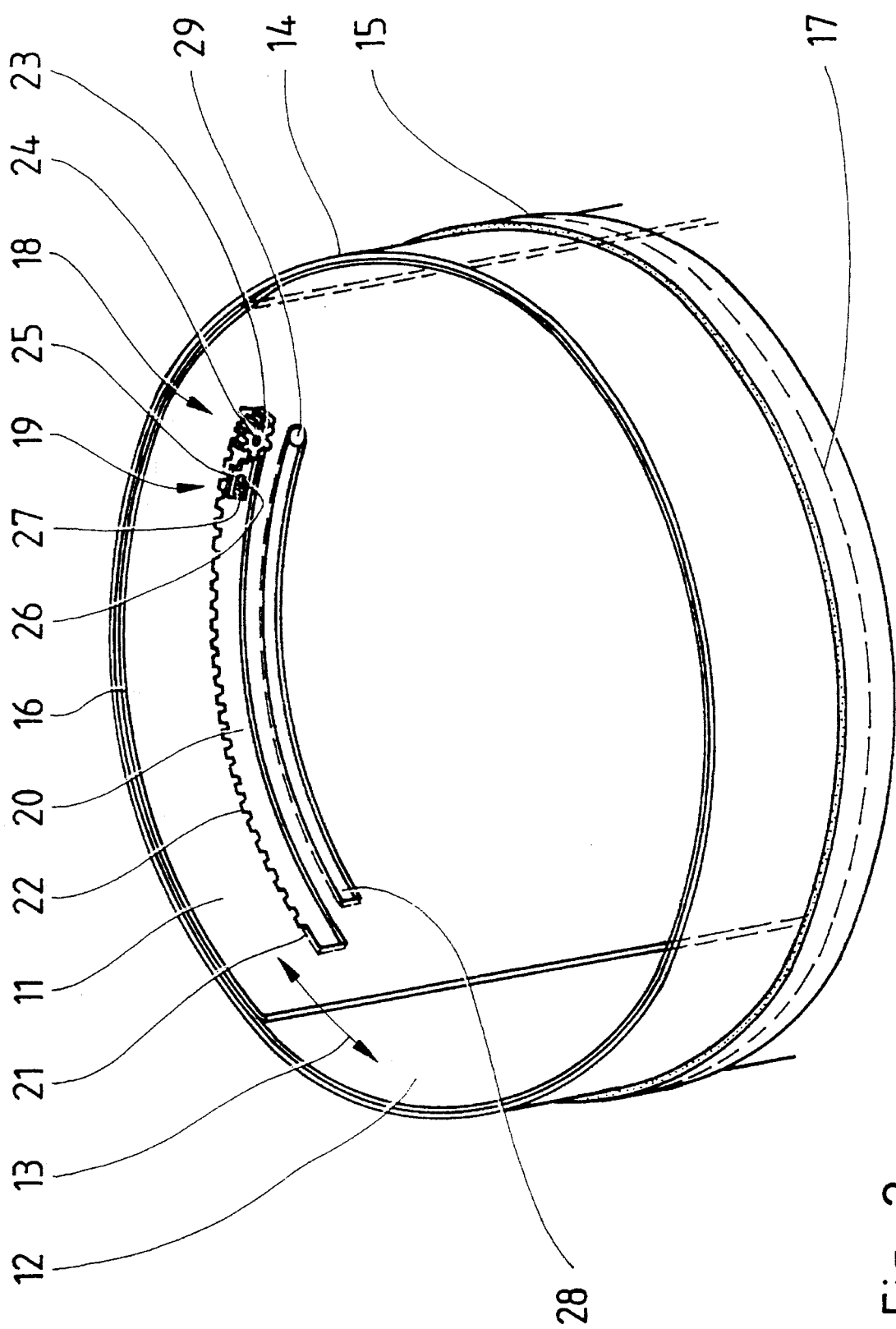
FIG. 2 is a partial perspective view of a sealing sleeve and a stopping device.

Also referring to FIG. 2, the sealing sleeve 1, which is essentially a hollow cylinder, is made of a resilient material, for example a sheet of non-rusting steel, and is in the form of a band bent in a ring or spiral shape, whose one inner-lying band end 11 is overlapped by another, outer-lying band end 12 in the circumferential direction 13. Sealing sleeve 1 is completely enclosed by a hose 14 of a rubber-elastic, corrosion-resistant material, and at both ends of the hose 14 a sealing band 15 extends circumferentially. The sealing bands 15 are of a rubberlike material that swells significantly upon contact with water. The two sealing bands 15 are respectively disposed closely adjacent to the circumferential edges 16 of sealing sleeve 1. A copper strip 17 in the form of a copper wire, copper band, wire mesh or a bundle of copper wire is inserted or formed into sealing bands 15.

Sealing sleeve 1 carries a widening device 18, which can be operated by mounting cart 2, and an automatically-operating stopping (immobilizing) device 19, which maintains sealing sleeve 1 in its circumferentially widened state.

Widening device 18 comprises a slot 20, which is disposed in the vicinity of inner-lying band end 11 and parallel to circumferential edge 16, and whose one longitudinal side 21 has a row of teeth 22. The widening device 18 further comprises a pinion 23 whose diameter is slightly smaller than the inner clearance of slot 20. The pinion 23 is seated in slot 20 and is rotatably supported on a stub 24 riveted to the outer-lying band end 12. Pinion 23 cooperates with the row of teeth 22 such that the teeth of pinion 23 mesh in each position of band ends 11, 12 with the teeth of the row of teeth 22.

A small locking bolt 25 which engages the teeth of the pinion 23 serves as a stopping device 19, which holds the widened sealing sleeve 1 irreversibly in its widened, stressed state. The locking bolt 25 is displaceably secured to the outer-lying band end 12 of sealing sleeve 1 by means of a rivet 26 that extends into a longitudinal slot of locking bolt 25. Locking bolt 25 is under the effect of a compression spring 27 seated in the longitudinal slot for pressing the front edge of locking bolt 25 against the pinion teeth. The front edge is adapted to the shape of the pinion teeth. Locking bolt 25 permits pinion 23 to rotate only in one direction that is established during widening—it blocks rotation in the opposite direction, thus causing sealing sleeve 1 to remain in the expanded state.

The inner-lying band end 11 has a narrow guide groove 28 which is disposed in circumferential direction 13, and into which extends a hold-down device 29 secured to the outer-lying band end 12. Hold-down device 29 is a rivet provided with a wide, flat head that overlaps guide groove 28.

Reverting to FIG. 1, mounting cart 2, which is provided to travel inside the pipe, has an undercarriage 30 in the form of an elongated-rectangular base plate. Undercarriage 30 has four wheels 31, of which two each are rotatably disposed on a common axle 32. Each of the two axles 32 is hinged to undercarriage 30 by means of an H-shaped shaped pivot frame 33, which is rectangular in plan and uses a pivot pin 34. Each pivot frame 33 is engaged by a cylinder-piston unit 35 operated with compressed air and is joined by its cylinder to undercarriage 30 and by its piston rod to an elongated lever of pivot frame 33. Pivot frames 33 form, together with cylinder-piston units 35, a raising and lowering device 36, which permits mounting cart 2 to drive into the pipe in the lowered position and to be raised at the designated location. Raising and lowering are effected by the pivoting of the two pivot frames 33 in the direction of the two arrows 37.

Mounting cart 2 has two operating devices 38 for widening devices 28 of sealing sleeve 1. The operating devices 38 are commercially-available rotary screw or nut driving devices 39 driven by compressed air and secured to undercarriage 30 by means of holding brackets 40. At the end of each rotary driving device 39, an essentially cylindrical, insertable screw mechanism 41 is seated at a right angle to the driving device 39. The mechanism 41 has a head 42, which has a socket 43 for receiving with a fit the pinion 23 of widening device 18 of sealing sleeve 1.

In addition to raising and lowering device 36 and the two operating devices 38, mounting cart 2 has two mechanical pressure pistons 44 which are operated with compressed air and are secured to the two holding brackets 40 of rotary driving devices 39. The pressure pistons 44 have plungers 45, which are displaceable perpendicularly to travel direction 10 of mounting cart 2. The longitudinal axes of the two screw mechanisms 41 and those of plungers 45 all lie in the vertical symmetry plane of mounting cart 2.

The coupling device 3 provided on undercarriage 30 of mounting cart 2 is a straight pipe, with the aid of which the cylinder-piston unit 35, the rotary screwdriver devices 39 and the pressure pistons 44 are supplied with compressed air from driving cart 4. The pipe is connected in a flexible manner to driving cart 4 and undercarriage 30. Coupling device 3 also includes the pneumatic control lines for operating working elements 35, 39 and 44 of mounting cart 2.

For the purpose of sealing a leakage point 7 in a pipe 8 from the inside of the pipe, the pipe interior is first cleaned and, if need be, smoothed by means of milling. Then driving cart 4 is driven into pipe 8, leakage point 7 is ascertained and localized with the aid of television camera 5, and driving cart 4 is withdrawn.

Thereafter, an appropriately dimensioned sealing sleeve 1, whose diameter is selected to be approximately 10% smaller than the inner clearance of pipe 8, is pushed over mounting cart 2 such that it encloses undercarriage 30 with operating devices 38, rotary driving devices 39 and pressure pistons 44, but leaves wheels 31 free. The position of sealing sleeve 1 is indicated in dashed lines in FIG. 1. Sealing sleeve 1 is then placed onto mounting cart 2 by setting it on operating device 38. During this procedure the two pinions 23 of widening device 18 of sealing sleeve 1 are inserted from above into sockets 43 of heads 42 of screw mechanisms 41. In this manner a form-fitting connection between operating device 38 and widening device 18 is obtained. Mounting cart 2 is connected to driving cart 4, and the driving cart presses the device against leakage point 7 under the observation of television camera 5.

Now the raising and lowering device 36 of mounting cart 2 becomes operational: mounting cart 2 is raised and thus sealing sleeve 1 is lifted to the top of the pipe interior and pressed thereagainst. Thereafter the operating device 38, namely the two rotary driving devices 39, is actuated to operate the widening devices 18 which expand the sealing sleeve 1 until it lies tightly against and around the inside circumference of the pipe, and hose 14, which encompasses sealing sleeve 1, seals leakage point 7 from the inside, in conjunction with the two sealing bands 15 at the ends. The elasticity of sealing sleeve 1 together with the yielding properties of hose 14 and the two swellable sealing bands 15 assure a permanent, complete sealing of leakage point 7.

Stopping device 19 holds sealing sleeve 1 in its widened state for a long period of time. As the last step of the sealing process, following operation of the two cylinder-piston units 35 by the extension of the two plungers 45 of pressure pistons 44, mounting cart 2 is released from sealing sleeve 1 and returns to its lowered position, and can now be withdrawn by driving cart 4.

All working elements 35, 39 and 44 of the mounting cart are connected to one another and to coupling device 3 by means of compressed air lines 46.

It will be understood that the above description of the present invention is susceptible to various modifications, changes and adaptations, and the same are intended to be comprehended within the meaning and range of equivalents of the appended claims.

What is claimed is:

1. In an apparatus for sealing leakage points in pipes from the inside of the pipe; the apparatus having a sealing sleeve widenable in the circumferential direction at the leakage point and a mounting cart directable to the leakage point; the sealing sleeve being a widenable, resilient band bent into a ring-shape; the band having two band ends overlapping in a circumferential direction, the sleeve being completely surrounded by a hose made of rubber-elastic material and supporting a stopping device that holds the sleeve in a widened state thereof; the mounting cart having an undercarriage provided with wheels; the improvement wherein the sealing sleeve has at least one widening device that can be operated by the mounting cart; the stopping device being connected with the widening device; and wherein the mounting cart has an operating device for the widening device and a raising and lowering device for the operating device.

2. The apparatus as defined in claim 1, wherein the widening device of the sealing sleeve comprises at least one slot disposed in the circumferential direction at the inner-lying band end, one longitudinal side of the slot having a row of teeth; and further comprising a pinion engaging the row of teeth and being rotatably seated at the outer-lying band end.

3. The apparatus as defined in claim 2, wherein the stopping device comprises a locking bolt that lies in the slot and engages the pinion and is under the effect of a spring element.

4. The apparatus as defined in claim 2, wherein the inner-lying band end of the sealing sleeve has a guide groove provided in the circumferential direction; further wherein a hold-down device extends into the guide groove and is secured to the outer-lying band end.

5. The apparatus as defined in claim 1, wherein the sealing sleeve has two sealing bands on the hose that extend circumferentially and are made of a rubberlike material that swells upon contact with water, and are disposed adjacent to the two circumferential edges of the sealing sleeve.

6. The apparatus as defined in claim 5, wherein copper strips are inserted into the sealing bands.

7. The apparatus as defined in claim 1, wherein the undercarriage of the mounting cart has, as an operating device for the widening device of the sealing sleeve, at least one motor-driven rotary screwdriver device, whose screw mechanism has on its head a socket for receiving the pinion of the widening device.

8. The apparatus as defined in claim 1, wherein the undercarriage of the mounting cart has four wheels, of which two each are rotatably secured to a common axle.

9. The apparatus as defined in claim 8, wherein each axle is hinged to the undercarriage by means of a pivot frame to form the raising and lowering device; further comprising a cylinder-piston unit engaging each pivot frame.

10. The apparatus as defined in claim 1, wherein the mounting cart has at least one mechanical pressure plunger which is effective perpendicularly to a travel direction of the mounting cart.

11. The apparatus as defined in claim 1, further comprising a remote-controlled driving cart and a coupling device provided on the undercarriage to connect the mounting cart to the remote-controlled driving cart.

12. A method of sealing leakage points in pipes from inside the pipe, comprising the following steps:

(a) providing an apparatus having a sealing sleeve widenable in the circumferential direction at the leakage point and a mounting cart directable to the leakage point; the sealing sleeve being a widenable, resilient band bent into a ring-shape; the band having two band ends overlapping in a circumferential direction, the sleeve being completely surrounded by a hose made of rubber-elastic material and supporting a stopping device that holds the sleeve in a widened state thereof; the mounting cart having an undercarriage provided with wheels; the sealing sleeve having at least one widening device that can be operated by the mounting cart; the stopping device being connected with the widening device; and the mounting cart having an operating device for the widening device and a raising and lowering device for the operating device;

b) pushing the sealing sleeve over the mounting cart such that it surrounds the undercarriage and leaves the wheels free;

c) placing the sealing sleeve onto the mounting cart;

d) raising the sealing sleeve to the top of the inside of the pipe and pressed thereagainst;

e) widening the sealing sleeve until it lies tightly against and around the inside circumference of the pipe;

f) maintaining the sealing sleeve in the widened state by a stopping device to seal the leakage point.

13. The method as defined in claim 12, further comprising the step of separating, after step (d), the mounting cart from the sealing sleeve by pushing by means of mechanical pressure plungers.

14. An apparatus for sealing a leakage point in a pipe from the inside of the pipe, comprising:

a sealing sleeve comprising:

a resilient band widenable in a circumferential direction at the leakage point and being bent into a ring-shape, the band having two band ends overlapping in the circumferential direction; and widening means for widening said resilient band;

stopping means for holding said sealing sleeve in a widened state thereof and being connected with said widening means, said stopping means being supported by said sealing sleeve;

a hose completely surrounding said sealing sleeve and being composed of a rubber-elastic material; and a mounting cart having an undercarriage provided with wheels and being directable to the leakage point, and comprising:

an operating means for operating said widening means; and raising and lowering means for raising and lowering said operating means.

* * * * *